United States Patent
Hamilton et al.

(10) Patent No.: US 9,895,696 B2
(45) Date of Patent: Feb. 20, 2018

(54) MATERIAL PROCESSING APPARATUS WITH AUXILIARY DRIVE SYSTEM

(71) Applicant: Terex GB Limited, Dungannon, County Tyrone (GB)

(72) Inventors: Jamie Hamilton, Omagh (GB); Robert Gilmour, Omagh (GB)

(73) Assignee: Terex GB Limited, Dungannon, County Tyrone (GB)

(*) Notice: Subject to any disclaimer, the term of this patent is extended or adjusted under 35 U.S.C. 154(b) by 318 days.

(21) Appl. No.: 14/659,998

(22) Filed: Mar. 17, 2015

(65) Prior Publication Data

US 2015/0266027 A1    Sep. 24, 2015

(30) Foreign Application Priority Data

Mar. 18, 2014  (GB) .................................. 1404863.1

(51) Int. Cl.
| | |
|---|---|
| *B02C 1/00* | (2006.01) |
| *B02C 1/02* | (2006.01) |
| *B02C 21/02* | (2006.01) |
| *F16D 11/00* | (2006.01) |

(Continued)

(52) U.S. Cl.
CPC .............. *B02C 1/02* (2013.01); *B02C 1/025* (2013.01); *B02C 21/026* (2013.01); *F16D 11/00* (2013.01); *F16G 13/02* (2013.01); *F16H 7/06* (2013.01)

(58) Field of Classification Search
CPC ......... B02C 1/02; B02C 1/025; B02C 21/026; F16H 7/06; F16D 11/00; F16G 13/02
See application file for complete search history.

(56) References Cited

U.S. PATENT DOCUMENTS

| | | | | |
|---|---|---|---|---|
| 1,886,537 A | * | 11/1932 | Evans ..................... | B60K 25/00 180/53.1 |
| 2008/0035771 A1 | * | 2/2008 | Thome ..................... | B02C 17/18 241/101.2 |
| 2010/0193616 A1 | * | 8/2010 | Berger ................... | B02C 15/006 241/30 |

FOREIGN PATENT DOCUMENTS

| | | |
|---|---|---|
| JP | H06246181 A | 9/1994 |
| JP | 2000033285 A | 2/2000 |
| JP | 2010082595 A | 4/2010 |

OTHER PUBLICATIONS

European Search Report dated Jul. 23, 2015, for European patent application EP 15159270, corresponding to U.S. Appl. No. 14/659,998.

* cited by examiner

*Primary Examiner* — Faye Francis (74) *Attorney, Agent, or Firm* — Warner Norcross & Judd LLP (57) ABSTRACT

A material processing apparatus comprising a rotary operating device coupled to a material processing device, especially a crusher. A primary drive system is coupled to the rotary operating device. An auxiliary drive system has a rotary drive member and is operable between a driving state, in which it is coupled to the rotary operating device, and a non-driving state in which it does not rotate the rotary operating device. The apparatus is operable in a primary mode in which the primary drive system rotates the rotary operating device and the auxiliary drive system is in its non-driving state, or in an auxiliary mode in which the auxiliary drive system is in its driving state. In the auxiliary mode, the auxiliary drive system may be operated to repeatedly rotate the rotary operating device alternately in both (Continued)

rotational directions to impart a back-and-forth rocking motion to the material processing device.

37 Claims, 7 Drawing Sheets

(51) Int. Cl.
*F16G 13/02* (2006.01)
*F16H 7/06* (2006.01)

MATERIAL PROCESSING APPARATUS WITH AUXILIARY DRIVE SYSTEM

FIELD OF THE INVENTION

The present invention relates to material processing apparatus. The invention relates particularly, but not exclusively, to crushers.

BACKGROUND TO THE INVENTION

The Powerscreen Premiertrak 600 is an example of a material processing apparatus comprising a crusher, in particular a jaw crusher. The crusher is operated by rotating a fly wheel, rotational movement of the fly wheel being translated into reciprocating movement of a jaw within the crusher. The fly wheel may be driven by a direct drive system that is capable of rotating the fly wheel in one direction only. A problem with using the direct drive system is that it is cumbersome to remove material that becomes jammed in the crusher. In the event of a jam, the crusher must be emptied and the jammed material removed manually. The crusher must then be restarted while empty since the direct drive system is not suitable for starting under load conditions. As an alternative to the direct drive system, a hydrostatic drive system may be used that is capable of driving the fly wheel in either direction. This allows jams to be cleared automatically and without having to empty the crusher. However hydrostatic drives are relatively expensive and suffer from relatively poor fuel efficiency and power utilisation in comparison with the direct drive system.

It would be desirable to mitigate the problems outlined above.

SUMMARY OF THE INVENTION

The invention provides a material processing apparatus comprising: a material processing device;

a rotary operating device coupled to said material processing device for the operation thereof;

a primary drive system coupled to said rotary operating device and being operable to rotate said rotary operating device; an auxiliary drive system having a rotary drive member, said auxiliary drive system being operable between a driving state, in which said rotary drive member is coupled to said rotary operating device and is operable to rotate said rotary operating device, and a non-driving state in which said auxiliary driving system does not rotate said rotary operating device, wherein said processing apparatus is operable in a primary mode in which said primary drive system rotates said rotary operating device and said auxiliary drive system is in said non-driving state, or in an auxiliary mode in which said auxiliary drive system is in said driving state and operated to rotate said rotary operating device.

The material processing device may for example be a crusher, especially a jaw type crusher.

In preferred embodiments, the primary drive system comprises a uni-directional motor (typically an internal combustion engine) directly driving a pulley, the pulley being coupled to the rotary operating device, e.g. by a drive belt. The auxiliary drive system comprises a bi-directional motor (typically a hydraulic motor) driving the rotary drive member. The rotary drive member may comprise a sprocket that is movable into and out of engagement with corresponding coupling formations provided on the operating device. Conveniently, the coupling formations on the operating device are provided by the links of a chain.

Preferred embodiments of the invention offer the advantages associated with a direct drive system, including low cost, durability and efficiency, via the primary drive system while offering the additional functionality provided by a reversible drive system, namely the ability to clear blockages, via the auxiliary drive system.

Other preferred features are recited in the dependent claims appended hereto.

Further advantageous aspects of the invention will be apparent to those ordinarily skilled in the art upon review of the following description of a specific embodiment and with reference to the accompanying drawings.

BRIEF DESCRIPTION OF THE DRAWINGS

An embodiment of the invention is now described by way of example and with reference to the accompanying drawings in which.

DETAILED DESCRIPTION OF THE DRAWINGS

Referring now to the drawings, there is shown, generally indicated as 10, a material processing apparatus. In general, the apparatus 10 may be configured to perform any one or more of a plurality of processes, such as feeding, screening, separating, crushing, waste recycling or demolition and/or washing, on one or more types of aggregate or other material, for example rocks, stones, gravel, sand and/or soil, or any other material that is quarried, mined or excavated. To this end, the apparatus may include one or more material processing device 12 configured to perform one or more of the foregoing processes. In typical embodiments of the invention, and as is illustrated, the material processing device 12 comprises a crusher. It will be understood that the invention is not limited to crushers and may be employed with other types of material processing device, in particular those that are operable by means of a rotary operating device.

The apparatus 10 is typically carried by a chassis 13. The chassis 13 may also carry one or more other components that facilitate use of the crusher 12, usually a feed assembly 14 for delivering material to the crusher 12 and one or more conveyors 16 for transporting crushed or uncrushed material, e.g. for the purposes of stockpiling. The feed assembly 14 may comprises a hopper 18 and a screen 20. In a typical arrangement, material deposited into the hopper 18 is graded by the screen 12 as a result of which some of the material (usually the larger pieces that do not pass through the screen 20) is fed to the crusher 12 while the rest bypasses the crusher 12 and is directed elsewhere, e.g. to a conveyor.

The powered components of the apparatus 10, including the crusher 12, conveyors 16 and feed assembly 14 are typically powered by one or more hydraulic system comprising motor(s), actuator(s) and/or other component as required. It will be understood that alternative power systems, e.g. electrical or pneumatic systems, may be used, and so the motor(s) and other components may be powered by alternative means. An electrical system may also be provided as would be apparent to a skilled person. In any event the apparatus 10 includes a power plant 22 for generating the requisite power (e.g. including electrical, hydraulic and/or pneumatic power as applicable) for the apparatus 10. The power plant 22 may take any convenient conventional form, e.g. comprising any one or more of an engine, compressor and/or batteries.

In typical embodiments, the apparatus 10 is mobile and comprises one or more wheels and/or tracks 11 mounted on the chassis 13. The apparatus 10 may be self-propelled and to this end the power plant 22 usually comprises an internal combustion engine (not visible). In such cases, the internal combustion engine conveniently generates power for the hydraulic system(s), e.g. by operating the hydraulic pump(s) (not shown), and may also power an electric generator (not shown) for the electrical system.

Figure 1:
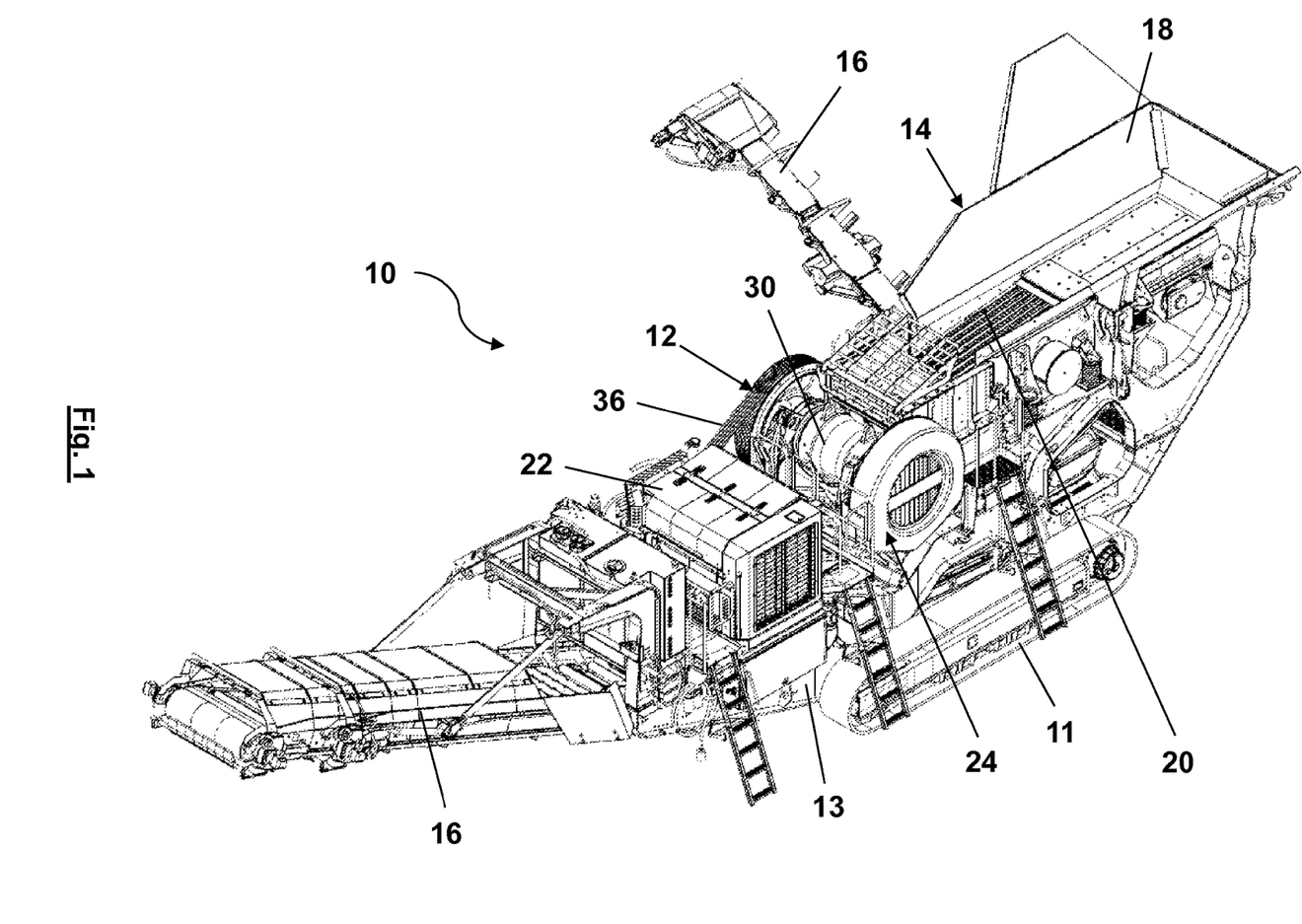
FIG. 1 is a perspective view of a material processing apparatus embodying one aspect of the invention.
Figure 2:
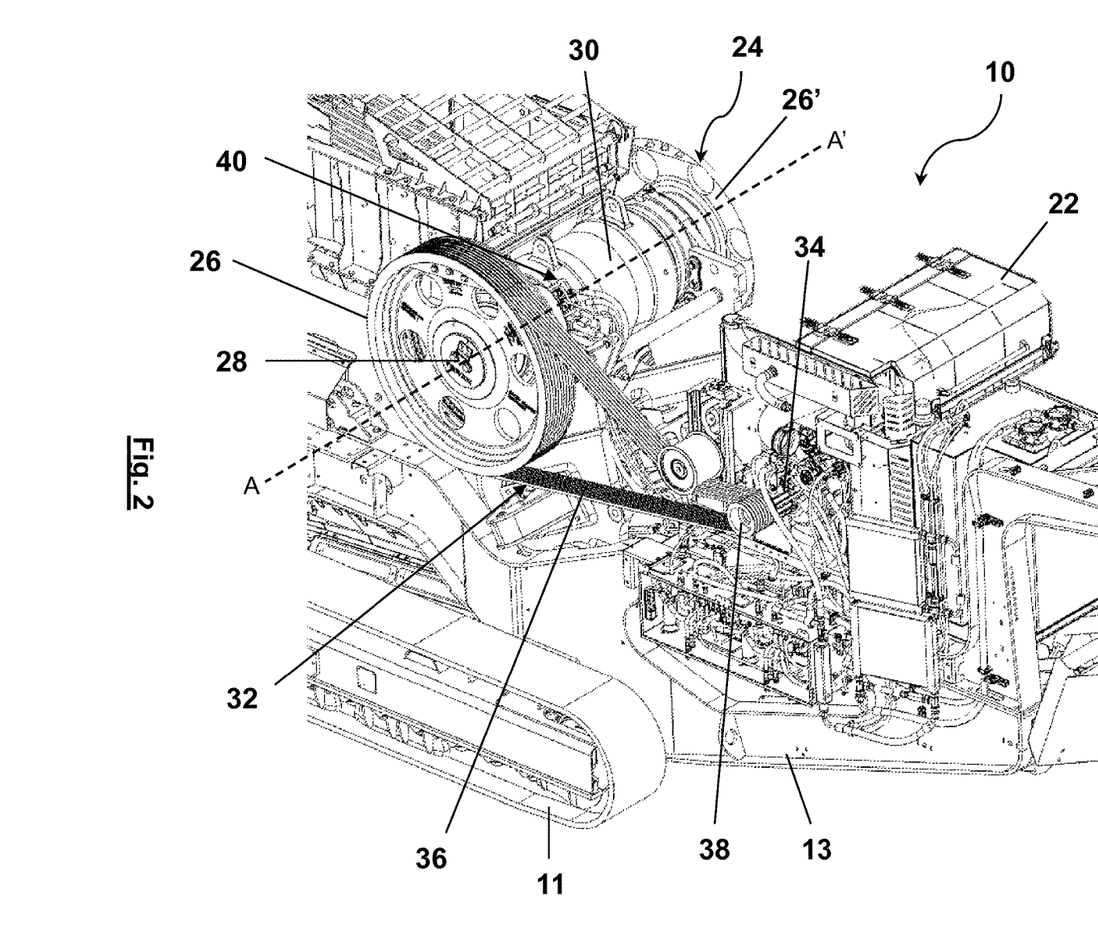
FIG. 2 is a perspective enlarged view of part of the apparatus of FIG. 1.

The crusher 12 includes a rotary operating device 24 that is rotatable about an axis A-A'. During use, rotation of the rotary operating device 24 about axis A-A' operates the crusher 12. In a normal operating mode, the rotary operating device 24 is rotated in one direction only, e.g. counter-clockwise as viewed in FIG. 2. In the illustrated embodiment, the crusher 12 is a jaw crusher comprising a movable jaw (not visible) and another, typically fixed, jaw between which material may be crushed. The rotary operating device 24 is coupled to the movable jaw such that rotation of the device 24 causes the movable jaw to move back and forth with respect to the other jaw to effect a crushing action. The rotary operating device 24 typically comprises a fly wheel 26. The flywheel 26 is mounted on an shaft 28, the shaft 28 being coupled to the movable jaw. In the illustrated embodiment, a second fly wheel 26' is mounted on the opposite end of the shaft 28. The shaft 28 is contained usually within a housing 30.

A primary drive system 32 is coupled to the rotary operating device 24 in order to rotate the device 24 about axis A-A'. The primary drive system 32 comprises a motor 34 coupled to the device 24 by one or more drive belt 36. The motor 34 typically takes the form of an internal combustion engine, for example the same engine that may be provided to drive the wheels/tracks 11, and which is conveniently included in the power plant 22. Conveniently, the drive belt(s) 36 runs around the fly wheel 26 and so the fly wheel 26 also serves as a pulley in the primary drive system 32. The primary drive system 32 includes a second pulley 38 coupled to the motor 34. In use, the motor 34 drives (rotates) the second pulley 38, which drives the belt 36, which in turn drives (rotates) the fly wheel 26. Typically, the motor 34 is coupled to the second pulley 38 by a clutch (not visible). In preferred embodiments, the motor 34 drives the second pulley 38 directly, i.e. without an intervening gearbox or source of torque reduction. The preferred primary drive system 32 is advantageous in that it is relatively inexpensive, robust, fuel efficient and power transfer efficient. However, it is only able to rotate the rotary operating device 24 in one direction (counter-clockwise as viewed in FIG. 2) because, in this example, the output shaft of the motor 34 is only capable of rotating in one direction and, in the absence of an intermediate gearbox or other mechanism to allow the drive direction to be reversed, the pulley 38 can only be rotated in one direction. The inability to reverse the direction of drive, means that the primary drive system 32 cannot be used to assist in clearing a blockage of the crusher 12 by driving the operating device 24 in the opposite sense (clockwise as viewed in FIG. 2).

Figure 3:
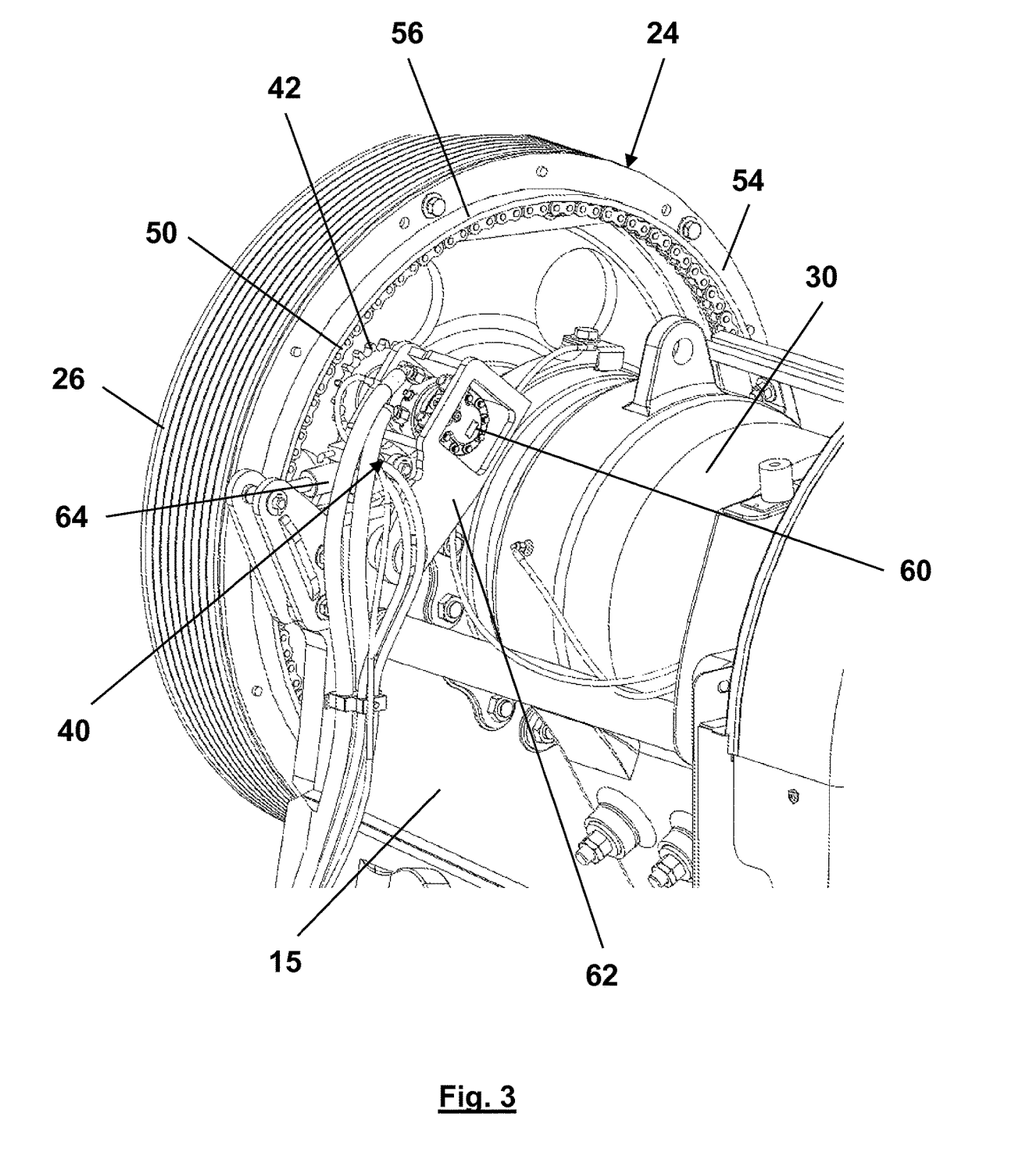
FIG. 3 is a perspective view of part of a crusher included in the apparatus of FIG. 1, also showing an auxiliary drive system.
Figure 7:
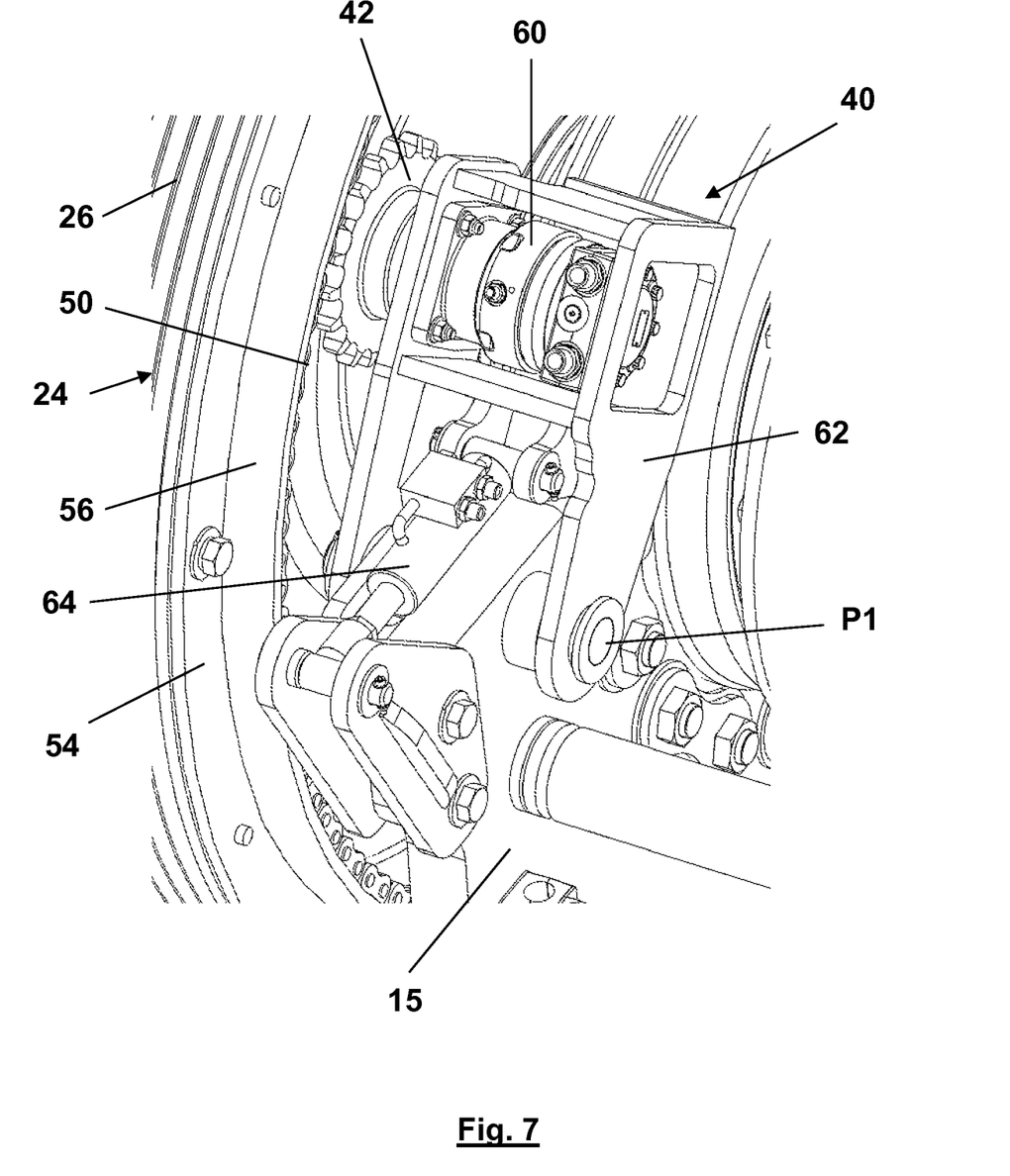
FIG. 7 is a perspective view of the auxiliary drive system in a non-driving state.
Figure 8:
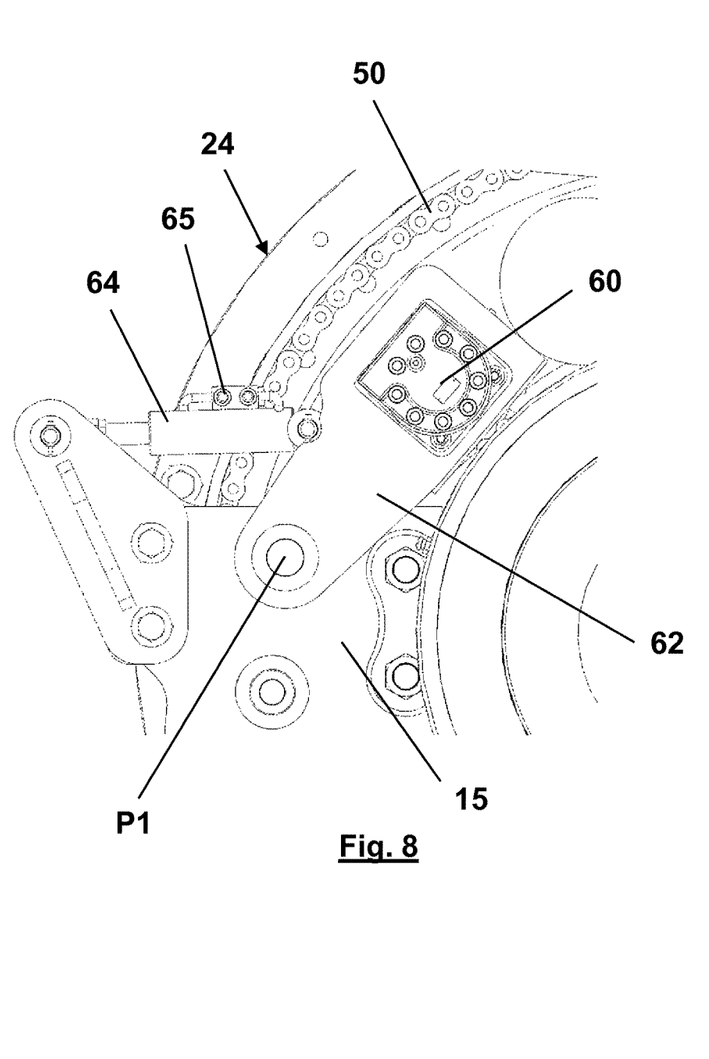
FIG. 8 is a side view of the auxiliary drive system in the non-driving state.

The apparatus 10 includes an auxiliary drive system 40 comprising a rotary drive member 42 and being operable between a driving state (shown in FIGS. 6 and 9), in which the rotary drive member 42 is coupled to the rotary operating device 24 and is operable to rotate the rotary operating device 24, and a non-driving state (shown in FIGS. 3, 7 and 8) in which it does not rotate the rotary operating device 24. The rotary drive member 42 is movable into and out of engagement with the rotary operating device 24, being in engagement with the rotary operating device 24 when the auxiliary drive system 40 is in its driving state, and being disengaged from the rotary operating device 24 when the auxiliary drive system 40 is in its non-driving state.

Engagement between the rotary drive member 42 and the rotary operating device 24 is effected by corresponding inter-engagable male and/or female formations provided on each component. In the illustrated embodiment, the rotary drive member 42 comprises male formations and the rotary operating device 24 comprises corresponding female formations, although this arrangement could be reversed, or each component 42, 24 may include both male and female formations. Conveniently, the rotary drive member 42 comprises a sprocket, including male formations in the form of a plurality of teeth 44 spaced apart around its circumference. The teeth 44 preferably have a rack tooth profile. Corresponding female formations 46 are spaced apart around a circumferential surface 48 of the rotary operating device 24. Conveniently, each female formation 46 is provided by respective link 49 of a chain 50, preferably a roller chain, extending around the circumferential surface 48. The surface 48 is preferably provided on the fly wheel 26, e.g. on the rim of the fly wheel or, preferably, on a support structure 52 carried by the fly wheel 26. In the illustrated embodiment, the support structure 52 comprises a base 54 fixed to the fly wheel 26 and a flange 56 projecting laterally from the fly wheel 26, the surface 48 being provided by the underside of the flange 56. The support structure 52 is preferably removable from fly wheel 26 to facilitate maintenance. To this end the base 54 may be fixed to the fly wheel 26 by means of bolts and/or dowels or other removable fixings. Preferably, the formations 46 are provided at the inward side of the fly wheel 26 (i.e. the side that faces inwardly of the apparatus 10). In the illustrated embodiment, the surface 48 faces inwardly towards the axis of rotation A-A'.

The auxiliary drive system 40 further includes a motor 60 for driving (rotating) the rotary drive member 42. The motor 60 is a reversible motor, i.e. capable of rotating the drive member 42 in either direction about a rotation axis B-B'. The rotation axis B-B' is substantially parallel with axis A-A', at least when the auxiliary drive system 40 is in the driving state. Typically, the motor 60 is a hydraulic motor and may be powered by the power plant 22

Advantageously, the auxiliary drive system 40 is operable in a neutral mode in which the rotary drive member 42 is freely rotatable. In the illustrated embodiment, the neutral mode is effected by configuration of the hydraulic circuit that controls the motor 60, as is described in more detail below. In this case, both the motor 60 and the drive member 42 can freely rotate in the neutral mode. In use, the auxiliary drive system 40 is operated to adopt the neutral mode as the rotary drive member is brought into engagement with the rotary operating device 24 when adopting the driving state. This facilitates inter-engagement of the respective male and female formations since the drive member 42 can freely rotate to allow, in this example, the teeth 44 to slot into a respective link 49. Optionally, the auxiliary drive system 40 is operated to adopt the neutral mode to facilitate disengagement of the drive member 42 from the operating device 24 when adopting the non-driving state.

Figures 4, 5, 6:
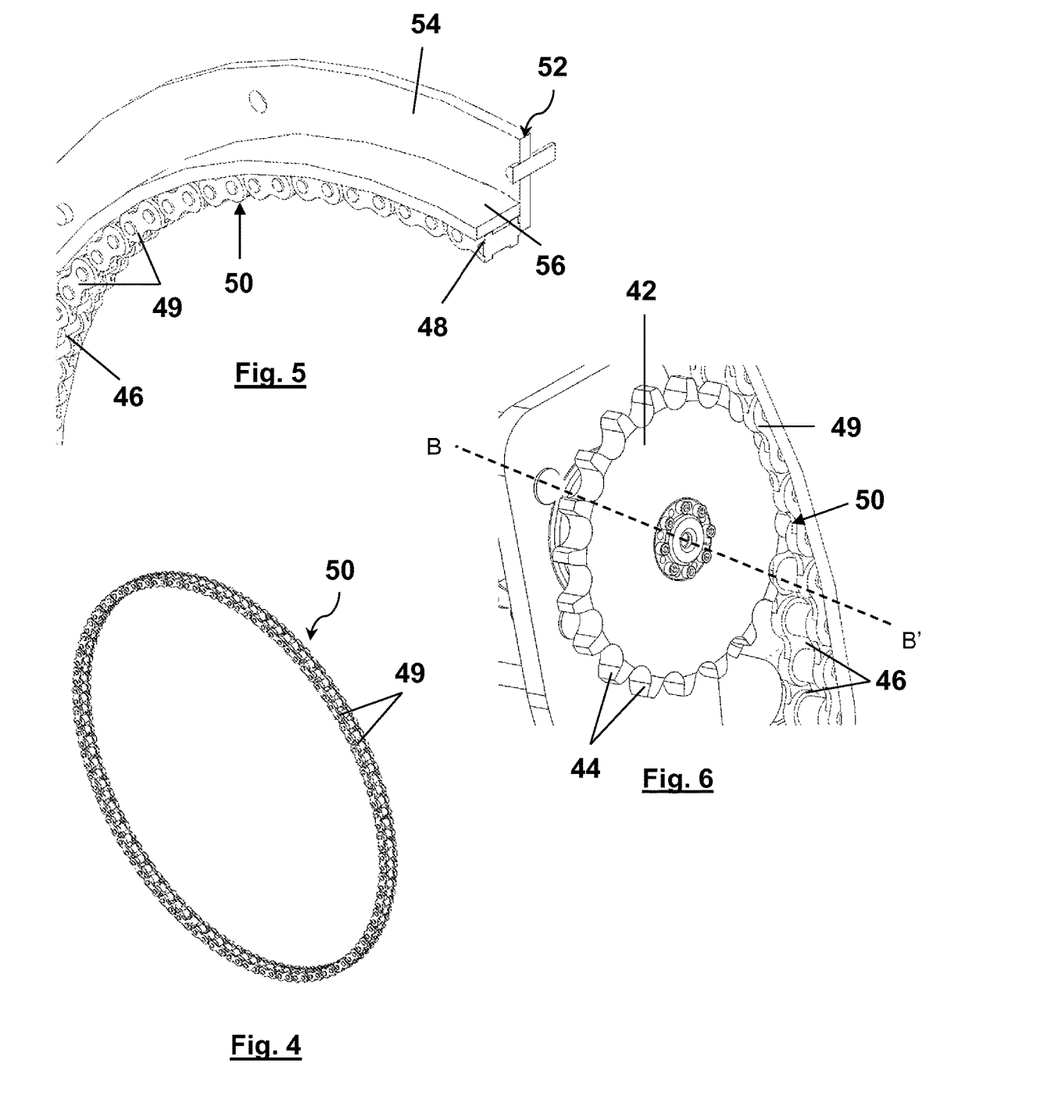
FIG. 4 is a perspective view of a chain suitable for use in the auxiliary drive system.
FIG. 5 is a perspective view of part of the chain of FIG. 4 fixed to a fly wheel of the crusher.
FIG. 6 is a perspective view of a sprocket of the auxiliary drive system engaging with the chain.
Figure 9:
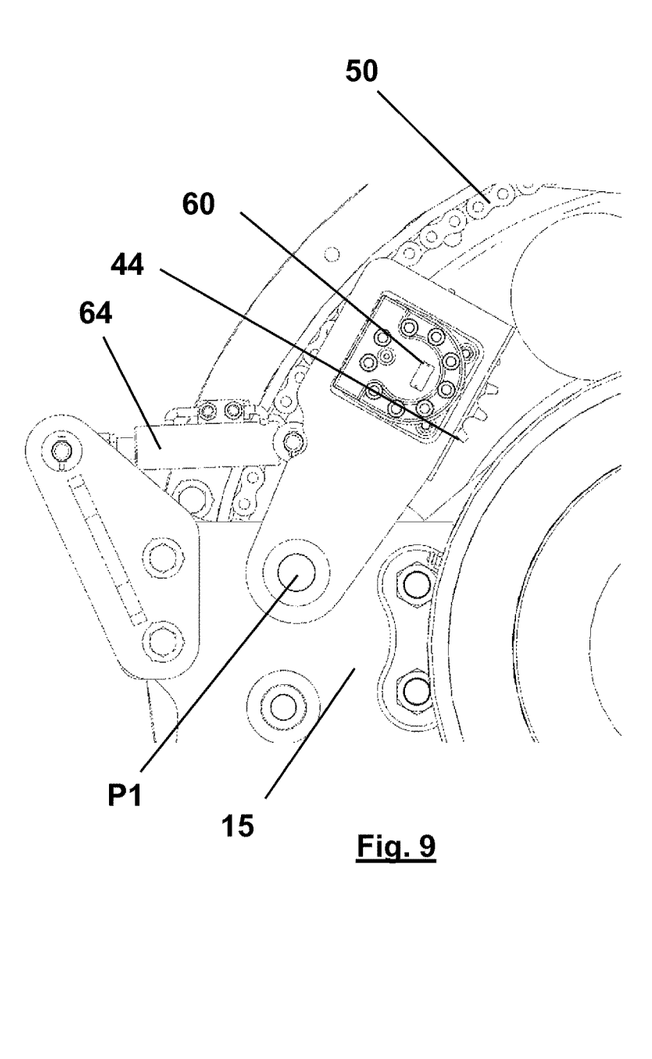
FIG. 9 is a side view of the auxiliary drive system in the driving state.

In the preferred embodiment, the auxiliary drive system 40 includes a carriage 62 that carries the rotary drive member 42 and conveniently also the motor 60. The carriage 62 movable with respect to the rotary operating device 24 into and out of a position in which the rotary drive member 42 engages with the rotary operating device 24 such that said respective male and female formations 44, 46 inter-engage. This position corresponds with the driving state of the system 40 as illustrated in FIGS. 6 and 9. Conveniently, the carriage 62 is pivotable into and out of the engaging position and may be pivotably coupled to the crusher 12 or other convenient part of the apparatus 10. In the illustrated embodiment, the carriage 62 is pivotably mounted on the body 15 of the crusher 12 at pivot point P1. Conveniently the carriage 62 is hydraulically operable into and out of the engaging position. In the illustrated embodiment, an actuator 64, e.g. a hydraulic ram, is provided for this purpose and may be coupled between the carriage 62 and the body 15 (or other convenient location on the apparatus 10). The actuator 64 and motor 60 are part of a hydraulic system, which may be powered by power plant 22, for operating the auxiliary system 40 as is described in more detail hereinafter. Preferably, a check valve 65 is included in the hydraulic circuit to prevent the rotary drive member 42 from moving out of engagement with the chain when the system 40 is in the driving state. Alternatively, the carriage 62 may be movable into and out of the engagement with the rotary operating device by any other powered means, e.g. comprising an electrically or pneumatically operable actuator.

Advantageously, the male and female formations provided on the rotary operating device 24 and on the rotary drive member 42 (in this example provided by the teeth 44 and links 49) have a respective longitudinal axis extending obliquely to, or preferably substantially parallel with, the rotational axis A-A' of the rotary operating device 24 or the rotational axis B-B' the rotary drive member 42 respectively. The formations comprise respective mating surfaces at which respective male 44 and female 46 formations inter-engage and by which rotational movement is imparted to the operating device 24 by the drive member 42. Advantageously, the mating surfaces extend obliquely to, or preferably substantially parallel with, the respective rotational axis A-A', B-B'. This reduces the chance of slippage between the drive member 42 and operating device 24 in the driving state.

In use, the apparatus 10 is operable in a primary mode in which the primary drive system 32 operates the crusher 12. To this end, the primary drive system 32 is configured such that the motor 34 drives the pulley 38, which drives the fly wheel 26 via the drive belt(s) 36. In the primary mode, the auxiliary drive system 40 is in its non-driving state, shown for example in FIG. 8. The apparatus 10 is alternatively operable in an auxiliary mode in which the auxiliary drive system 40 is in its driving state, as shown for example in FIG. 9, and is operated to drive the fly wheel 26. In the auxiliary mode, the auxiliary drive system 40 may be operated to rotate the operating device 24 alternately in both rotational directions (clock wise and counter clockwise about axis A-A') in order to facilitate clearance of material jams or blockages. Typically, the auxiliary drive system 40 is operated to repeatedly rotate the operating device 24 alternately in both rotational directions, i.e. to impart a back-and-forth rocking motion to the crusher 12, or other material processing device as applicable.

Typically, the primary drive system 32 is deactivated in the auxiliary mode, and this may be achieved by operating the clutch to disengage the motor 34 from pulley 38 to allow pulley 38 to rotate freely. Alternatively, the primary drive system 32 may be deactivated by removing the drive belt(s) 36 from the fly wheel 26.

In alternative embodiments (not illustrated) the circumferential surface 48 on which the formations of the operating device 24 are provided may face outwards away from the axis A-A'(e.g. outer surface of flange 56 may serve as surface 38), in which case the relevant components of the auxiliary drive system are positioned accordingly to allow the operation of the apparatus 10 as described above. Alternatively, or in addition, the circumferential surface 48 may be provided on the outward side of flywheel 26, the relevant components of the auxiliary drive system being positioned accordingly to allow the operation of the apparatus 10 as described above.

Figure 10:
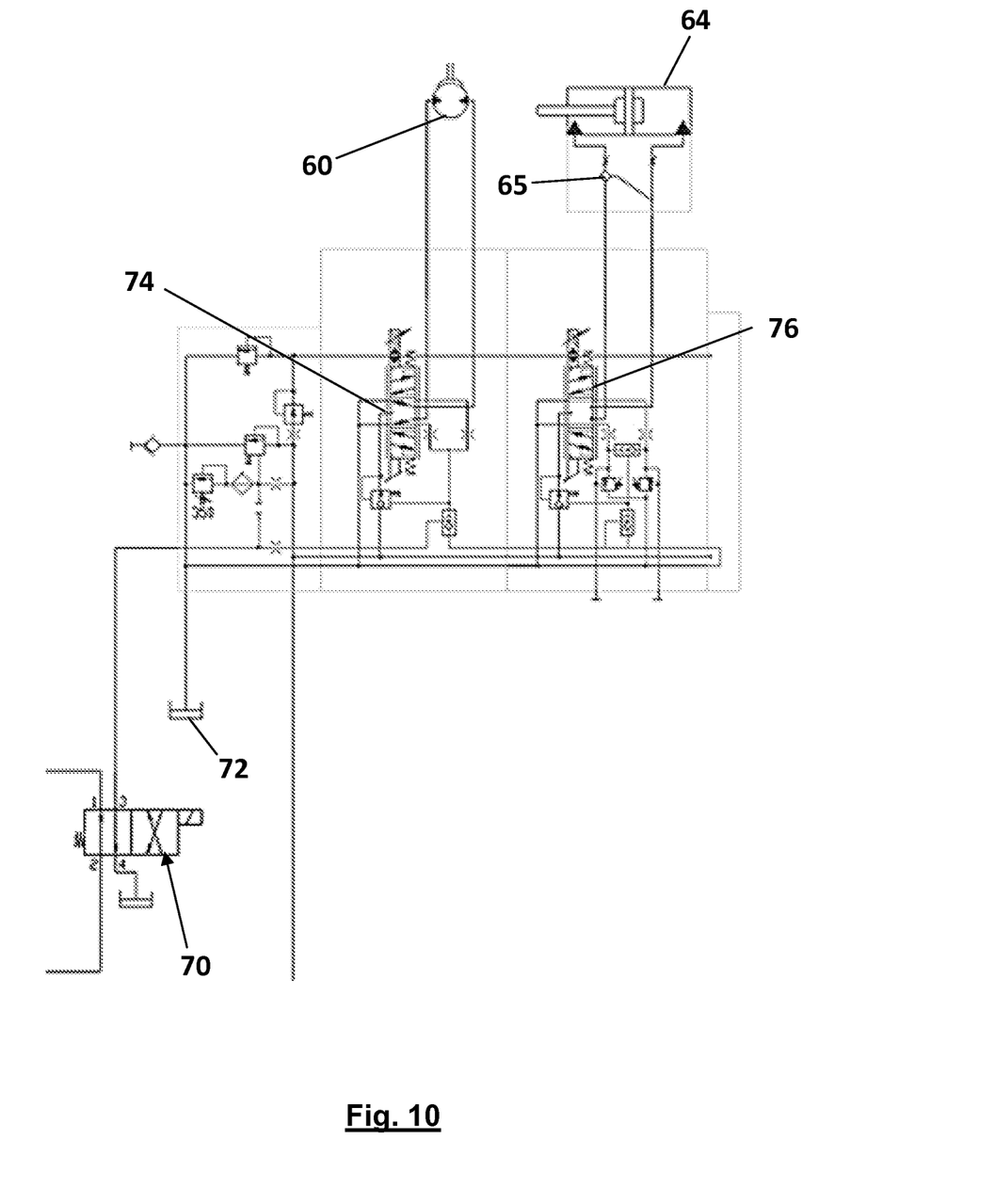
FIG. 10 shows an example of a hydraulic circuit that may be used to control the operation of the auxiliary drive system.

Referring now to FIG. 10 there is shown an example of a hydraulic circuit that may be used to control the operation of the auxiliary drive system 40. The hydraulic circuit comprises a pump (not shown) connected to a source of hydraulic fluid (the pump conveniently being driven by the power plant 22), a return tank 72 for the hydraulic fluid, the motor 60 and the actuator 64. A respective valve 74, 76 is provided for controlling the flow of fluid to and from the motor 60 and actuator 64. The circuit, or at least the part of it that supplies the motor 60, is configured as an open circuit such that, in the neutral mode the hydraulic fluid returns to the tank 72 without supplying hydraulic pressure to the motor 60. As such, the motor 60 can rotate freely. To this end, the valve 74, which may be of the type commonly referred to as an open centre valve, is operable in a mode (which is adopted during the neutral mode) in which the hydraulic fluid returns to the tank 72 through the valve without supplying hydraulic pressure to the motor 60.

The primary drive system 32 and auxiliary drive system 40 may be operated using any suitable control system, typically comprising a common, or a respective, user operable control panel (not shown), which may be electrical and/or hydraulic as applicable. The control system is preferably configured to implement an interlock such that the auxiliary drive system 40 cannot be operated into its driving state when the primary drive system 32 is driving the crusher 12. For example the control system may be configured such that the auxiliary drive system 40 cannot be operated into its driving state until the motor 34 has been disengaged from the pulley 38.

The invention is not limited to the embodiment described herein.

The invention claimed is:

1. A material processing apparatus comprising:
a material processing device;
a rotary operating device coupled to said material processing device for the operation thereof;

a primary drive system coupled to said rotary operating device and being operable to rotate said rotary operating device;
an auxiliary drive system having a rotary drive member, said auxiliary drive system being operable between a driving state, in which said rotary drive member is coupled to said rotary operating device and is operable to rotate said rotary operating device, and a non-driving state in which said auxiliary driving system does not rotate said rotary operating device,
wherein said processing apparatus is operable in a primary mode in which said primary drive system rotates said rotary operating device and said auxiliary drive system is in said non-driving state, or in an auxiliary mode in which said auxiliary drive system is in said driving state and operated to rotate said rotary operating device,
and wherein said rotary operating device comprises male and/or female formations for engagement with corresponding female and/or male formations provided on said rotary drive member.

2. The apparatus of claim 1 wherein, in said auxiliary mode, said primary drive system is deactivated.

3. The apparatus of claim 1 wherein, in said non-driving state, said rotary drive member is disengaged from said rotary operating device.

4. The apparatus of claim 1 wherein said rotary drive member is movable into and out of engagement with said rotary operating device, said rotary drive member being in engagement with said rotary operating device when said auxiliary drive system is in said driving state, and said rotary drive member being disengaged from said rotary operating device when said auxiliary drive system is in said non-driving state.

5. The apparatus of claim 1 wherein said male and/or female formations are spaced apart around a circumferential surface of said rotary operating device.

6. The apparatus of claim 5 wherein said circumferential surface faces inwardly towards the axis of rotation of said rotary operating device.

7. The apparatus of claim 5 wherein said circumferential surface faces outwardly away from the axis of rotation of said rotary operating device.

8. The apparatus of claim 5 wherein said rotary operating device includes a chain, a respective one of said female formations being provided by each link of said chain.

9. The apparatus of claim 8 wherein said chain extends around said circumferential surface of said rotary operating device.

10. The apparatus of claim 1, wherein said female and/or male formations are spaced apart around a circumferential surface of said rotary drive member.

11. The apparatus of claim 1 wherein said rotary operating device includes a plurality of female formations spaced apart around said circumferential surface.

12. The apparatus of claim 1 wherein said rotary drive member comprises a sprocket, including male formations in the form of a plurality of teeth spaced apart around its circumference.

13. The apparatus of claim 1 wherein said formations have a respective longitudinal axis extending obliquely to or parallel with the rotational axis of said rotary operating device and said rotary drive member.

14. The apparatus of claim 1 wherein said formations comprise respective mating surfaces at which respective male and female formations engage and by which rotational movement is imparted, said mating surfaces extending obliquely to and/or parallel with the rotational axis of said rotary operating device and said rotary drive member.

15. The apparatus of claim 1 wherein said auxiliary drive system comprises a motor for rotating said rotary drive member.

16. The apparatus of claim 15 wherein said motor comprises a hydraulic motor.

17. The apparatus of claim 1 wherein said auxiliary drive system is operable in a neutral mode in which said rotary drive member is freely rotatable.

18. The apparatus of claim 17 wherein said motor comprises a hydraulic motor and wherein said rotary drive member is coupled to said motor by a clutch, said clutch disengaging said motor from said rotary drive member in said neutral mode, or wherein said motor is operated by a hydraulic circuit configurable to allow said motor to rotate freely.

19. The apparatus of claim 1 wherein said auxiliary drive system includes a carriage that carries said rotary drive member, the carriage being movable with respect to said rotary operating device into and out of a position in which said rotary drive member engages with said rotary operating device such that said respective male and female formations inter-engage.

20. The apparatus of claim 19 wherein said carriage is pivotably movable with respect to
said rotary operating device.

21. The apparatus of claim 20 wherein said carriage is pivotably coupled to said material processing device.

22. The apparatus of claim 20 herein said carriage is power operable into and out of said engaging position.

23. The apparatus of claim 1, wherein said rotary operating member comprises a fly wheel, and wherein in said driving state said rotary drive member is coupled to said fly wheel.

24. The apparatus of claim 1, wherein said primary drive system comprises a motor coupled to said rotary operating device for the rotation thereof.

25. The apparatus of claim 24, wherein said rotary operating member comprises a fly wheel,
and wherein said motor is coupled to said fly wheel.

26. The apparatus of claim 24, wherein said motor is coupled to said rotary operating device by a drive belt, the belt being driven by a pulley coupled to said motor.

27. The apparatus of claim 26, wherein said pulley is coupled to said motor by means of a clutch.

28. The apparatus of claim 26, wherein said motor drives said pulley directly in use.

29. The apparatus of claim 1, wherein said primary drive system is operable to impart rotational movement to said rotary operating device in one rotational direction only.

30. The apparatus of claim 1, wherein said auxiliary drive system is operable to impart
rotational movement to said rotary operating device in either rotational direction.

31. The apparatus of claim 30, wherein said auxiliary drive system motor is capable of
rotating said drive member in either rotational direction about its rotational axis.

32. The apparatus of claim 30, wherein, in said auxiliary mode, the auxiliary drive system is operated to rotate said rotary operating device alternately in both rotational directions.

33. The apparatus of claim 32, wherein, in said auxiliary mode, the auxiliary drive system is operated to repeatedly rotate said rotary operating device alternately in both rotational directions to impart a back-and-forth rocking motion to the material processing device.

34. The apparatus of claim 1, wherein said material processing device comprises a crusher.

35. The apparatus of claim 34, wherein said crusher comprises a jaw type crusher.

36. A material processing apparatus comprising:
a material processing device;
a rotary operating device coupled to said material processing device for the operation thereof;
a primary drive system coupled to said rotary operating device and being operable to rotate said rotary operating device;
an auxiliary drive system having a rotary drive member, said auxiliary drive system being operable between a driving state, in which said rotary drive member is coupled to said rotary operating device and is operable to rotate said rotary operating device, and a non-driving state in which said auxiliary driving system does not rotate said rotary operating device,
wherein said processing apparatus is operable in a primary mode in which said primary drive system rotates said rotary operating device and said auxiliary drive system is in said non-driving state, or in an auxiliary mode in which said auxiliary drive system is in said driving state and operated to rotate said rotary operating device,
and wherein said auxiliary drive system is operable to impart rotational movement to said rotary operating device in either rotational direction.

37. A material processing apparatus comprising:
a material processing device;
a rotary operating device coupled to said material processing device for the operation thereof;
a primary drive system coupled to said rotary operating device and being operable to rotate said rotary operating device;
an auxiliary drive system having a rotary drive member, said auxiliary drive system being operable between a driving state, in which said rotary drive member is coupled to said rotary operating device and is operable to rotate said rotary operating device, and a non-driving state in which said auxiliary driving system does not rotate said rotary operating device,
wherein said processing apparatus is operable in a primary mode in which said primary drive system rotates said rotary operating device and said auxiliary drive system is in said non-driving state, or in an auxiliary mode in which said auxiliary drive system is in said driving state and operated to rotate said rotary operating device,
and wherein said auxiliary drive system comprises a hydraulic motor for rotating said rotary drive member.

* * * * *